(12) United States Patent
Chang

(10) Patent No.: US 10,011,320 B2
(45) Date of Patent: Jul. 3, 2018

(54) WHEEL HUB WITH AN AXIAL-BRAKING ASSEMBLY

(71) Applicant: G. FALCON CYCLE-PARTS CO., LTD., Taichung (TW)

(72) Inventor: Wei-Yueh Chang, Taichung (TW)

(73) Assignee: G. FALCON CYCLE-PARTS CO., LTD., Taichung (TW)

(*) Notice: Subject to any disclaimer, the term of this patent is extended or adjusted under 35 U.S.C. 154(b) by 55 days.

(21) Appl. No.: 15/199,878

(22) Filed: Jun. 30, 2016

(65) Prior Publication Data

US 2018/0001957 A1   Jan. 4, 2018

(51) Int. Cl.
| | |
|---|---|
| *B62L 5/12* | (2006.01) |
| *B62L 5/04* | (2006.01) |
| *B60B 27/02* | (2006.01) |
| *B60B 27/00* | (2006.01) |

(52) U.S. Cl.
CPC ............ *B62L 5/12* (2013.01); *B60B 27/0047* (2013.01); *B60B 27/023* (2013.01); *B62L 5/04* (2013.01)

(58) Field of Classification Search
CPC ...... B62L 5/02; B62L 5/04; B62L 5/08; B62L 5/10; B62L 5/12; B62L 5/16; B60B 27/023; B60B 27/0047; B60B 27/0057; B60B 27/047
USPC .............................. 192/217.3; 301/6.9, 110.5
See application file for complete search history.

(56) References Cited

U.S. PATENT DOCUMENTS

| | | | | |
|---|---|---|---|---|
| 582,600 | A * | 5/1897 | Bullard | B62L 5/04 192/217.3 |
| 770,460 | A * | 9/1904 | Glover | B62L 5/04 192/217.3 |
| 960,710 | A * | 6/1910 | Sachs | B62L 5/04 192/217.3 |
| 1,456,103 | A * | 5/1923 | Goodchild | B62L 5/04 188/206 A |
| 2,081,568 | A * | 5/1937 | Winkler | B62L 5/04 192/217.3 |
| 2,084,507 | A * | 6/1937 | Scaison | B62L 5/006 188/206 A |
| 2,084,508 | A * | 6/1937 | Scaison | B62L 5/006 188/206 A |
| 4,371,064 | A * | 2/1983 | Shimano | B62M 9/12 192/217.5 |
| 6,089,675 | A * | 7/2000 | Schlanger | B60B 27/023 280/279 |
| 9,758,209 | B2 * | 9/2017 | Schlanger | B62K 25/02 |

FOREIGN PATENT DOCUMENTS

DE                394046 C  *  4/1924  ............... B62L 5/04

* cited by examiner

*Primary Examiner* — Kip T Kotter
(74) *Attorney, Agent, or Firm* — Hershkovitz & Associates, PLLC; Abe Hershkovitz

(57) ABSTRACT

A wheel hub has an axle device and a braking device. The axle device has an axle and a hub body. The hub body is mounted rotatably around the axle. The braking device is connected to the axle device and has a driving sleeve, a braking sleeve, a pressing jacket, and a fixing member. The fixing member is mounted in the hub body, is mounted around an end of the axle, and has a first end and an elongated engaging protrusion. The elongated engaging protrusion is formed on and protrudes from the first end of the fixing member.

10 Claims, 6 Drawing Sheets

WHEEL HUB WITH AN AXIAL-BRAKING ASSEMBLY

BACKGROUND OF THE INVENTION

1. Field of the Invention

The present invention relates to a wheel hub and more particularly to a wheel hub with an axial-braking assembly.

2. Description of Related Art

A wheel hub is mounted around a wheel axle of a bicycle or a tricycle. When a pedal of the bicycle is stepped on, the wheel hub is rotated by the transmission of a transmitting device, such as a chain-and-sprocket assembly, and the bicycle is moving forward. With reference to FIG. 6, a conventional wheel hub 60 having a braking device is connected to a bicycle frame 70 by a connecting arm 62. Accordingly, the braking device in the wheel hub 60 can be prevented from loosening or unintentional rotation. However, the connecting arm 62 of the conventional wheel hub 60 has a large volume and is troublesome in assembly with the bicycle frame 70.

To overcome the shortcomings, the present invention tends to provide a wheel hub to mitigate or obviate the aforementioned problems.

SUMMARY OF THE INVENTION

The main objective of the invention is to provide a wheel hub having a braking device that can be assembled with a bicycle frame conveniently.

The wheel hub has an axle device and a braking device. The axle device has an axle and a hub body. The axle has a first end and a second end. The hub body is mounted rotatably around the axle. The braking device is connected to the axle device and has a driving sleeve, a braking sleeve, a pressing jacket, and a fixing member. The driving sleeve is mounted in the hub body and is mounted around the axle at a position adjacent to the first end of the axle. The braking sleeve is mounted in the hub body, is mounted around the axle, and has an inner surface. The pressing jacket is mounted around the axle, is connected with the driving sleeve, and has a conical pressing surface selectively extending into the braking sleeve to press against the inner surface of the braking sleeve. The fixing member is mounted in the hub body, is mounted around the second end of the axle, and has a first end and an elongated engaging protrusion. The first end of the fixing member is opposite the braking sleeve. The elongated engaging protrusion is formed on and protrudes from the first end of the fixing member.

Other objects, advantages and novel features of the invention will become more apparent from the following detailed description when taken in conjunction with the accompanying drawings.

DETAILED DESCRIPTION OF PREFERRED EMBODIMENT

Figure 1:
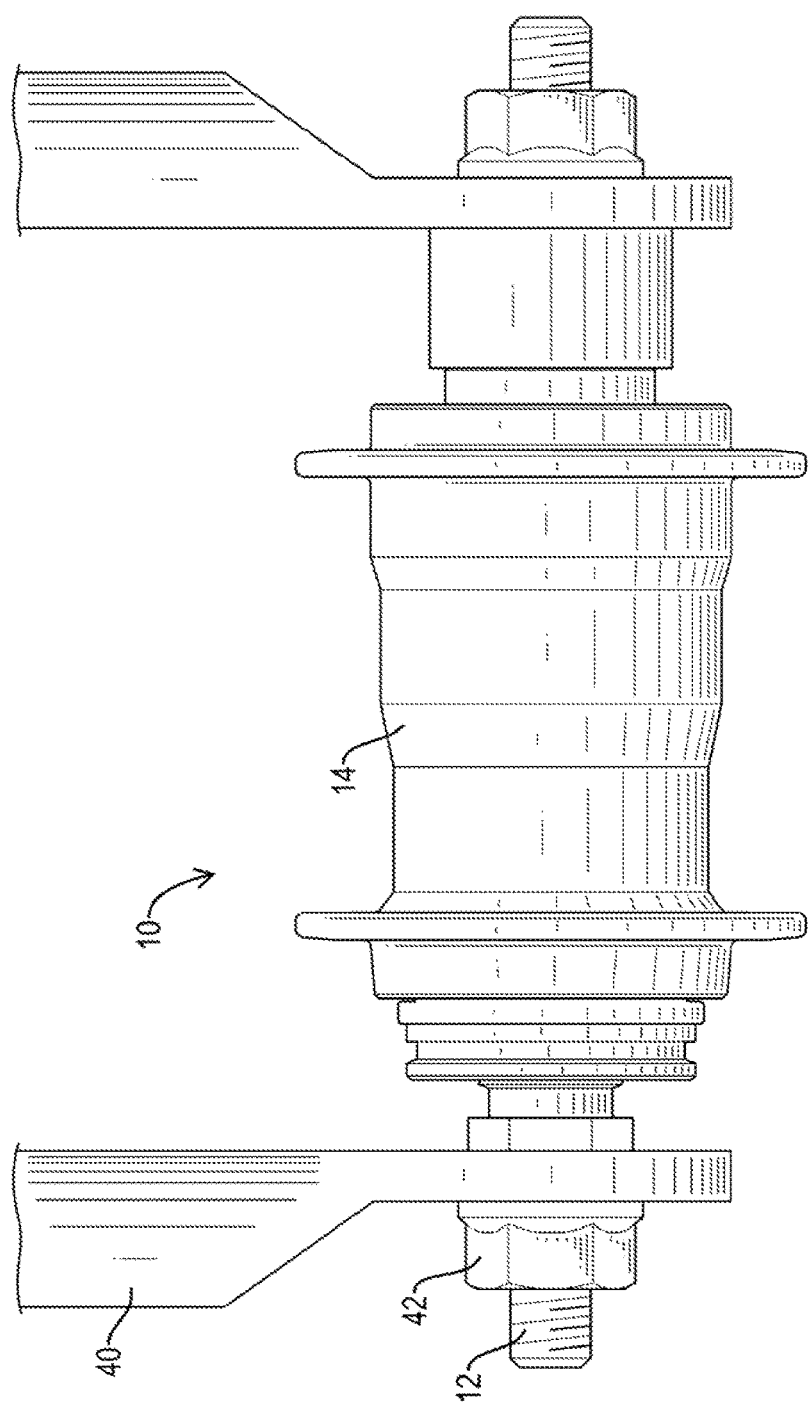
FIG. 1 is a side view of a wheel hub in accordance with the present invention.

With reference to FIGS. 1 to 4, a wheel hub in accordance with the present invention comprises an axle device 10 and a braking device 20. The axle device 10 has an axle 12 and a hub body 14 mounted rotatably around the axle 12. The axle 12 has a first end and a second end and is connected with a frame 40 of a bicycle. Preferably, the axle 12 is connected with a rear fork of a bicycle with nuts 42.

Figure 5:
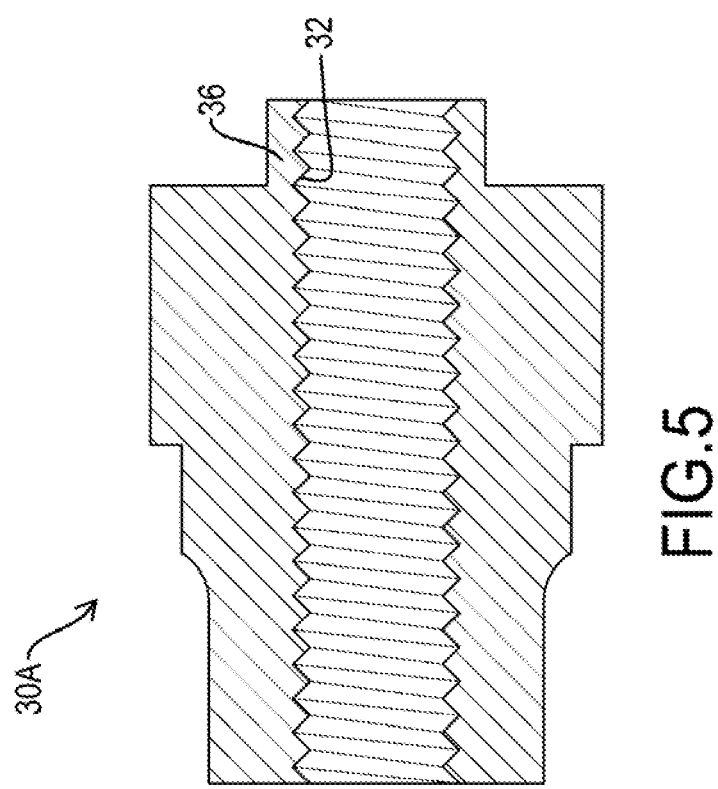
FIG. 5 is a cross sectional side view of a second embodiment of the fixing member of the wheel hub in FIG. 2.
Figure 6:
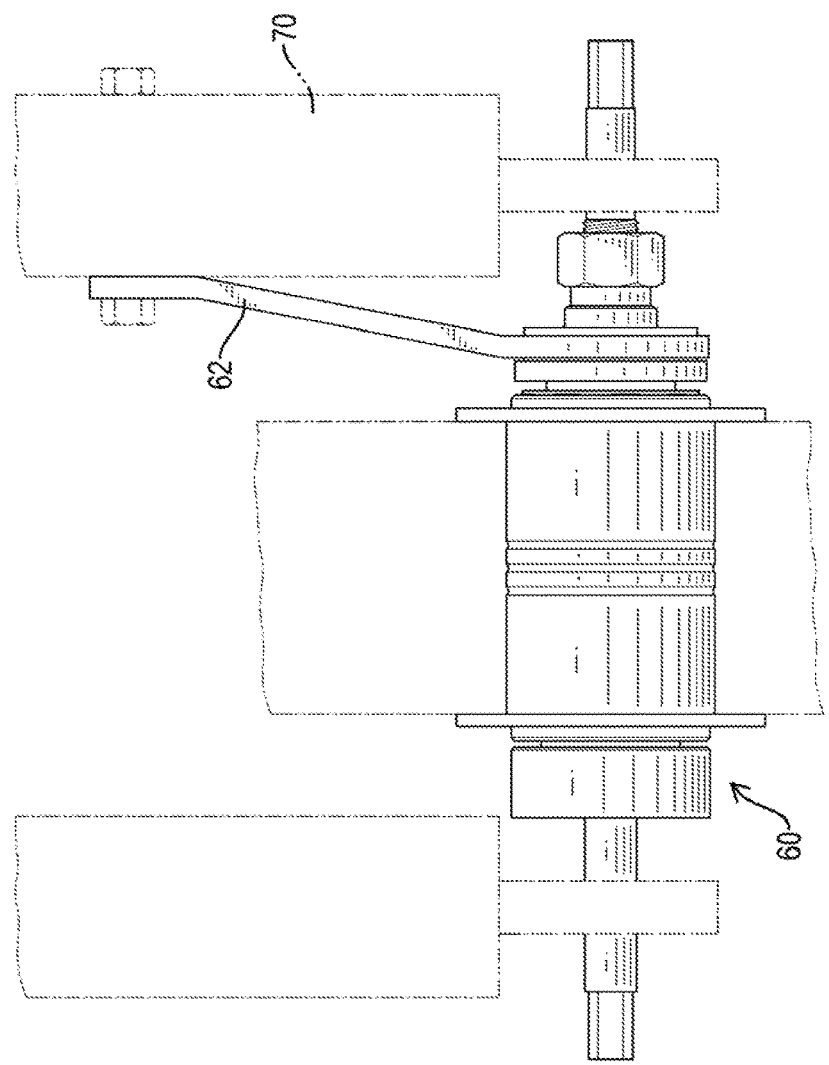
FIG. 6 is a side view of a conventional wheel hub.

The braking device 20 is connected to the axle device 10 and has a driving sleeve 22, a braking sleeve 24, a pressing jacket 26, and a fixing member 30. The driving sleeve 22 is mounted in the hub body 14 and is mounted around the axle 12 at a position adjacent to the first end of the axle 12. The braking sleeve 24 is mounted in the hub body 14, is mounted around the axle 12, and has an inner surface. The pressing jacket 26 is mounted around the axle 12, is connected with the driving sleeve 22, and has a conical pressing surface 264 selectively extending into the braking sleeve 24 to press against the inner surface of the braking sleeve 24. The fixing member 30 is mounted in the hub body 14, is mounted around the second end of the axle 12, and has a first end and an elongated engaging protrusion 36. The first end of the fixing member 30 is opposite the braking sleeve 24. The elongated engaging protrusion 36 is formed on and protrudes from the first end of the fixing member 30. In addition, the fixing member 30 has a threaded hole 32 for being screwed with the axle 12. Preferably, the threaded hole 32 is formed through two ends of the fixing member 30A as shown in FIG. 5. Accordingly, the fixing member 30 is securely mounted around the axle 12 in a threaded manner. In addition, the fixing member 30 has a second end extending into the hub body 14 and a conical surface 34 mounted in the braking sleeve 24 to selectively abut against the inner surface of the braking sleeve 24. The elongated engaging protrusion 36 is engaged with an engaging recess 44 defined in the rear fork of the bicycle to prevent the fixing member 30 from rotating relative to the rear fork. Accordingly, the connection structure between the wheel hub and the frame 40 of the bicycle is compact and is aesthetically appealing in appearance. With the arrangement of the fixing member 30, the wheel hub in accordance with the present invention can be combined with a frame 40 of a bicycle conveniently.

Figure 2:
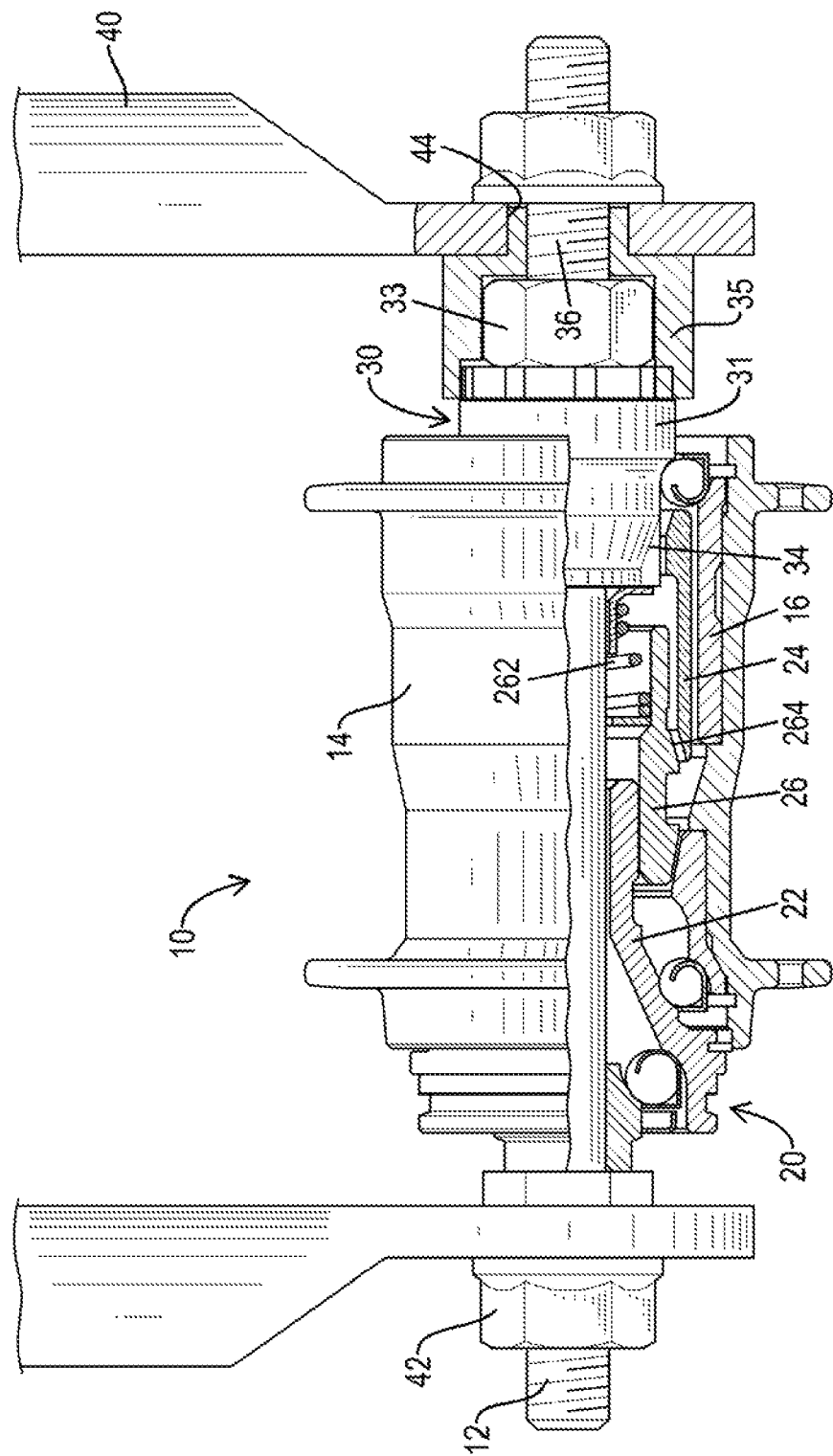
FIG. 2 is a side view in partial section of the wheel hub in FIG. 1.
Figure 3:
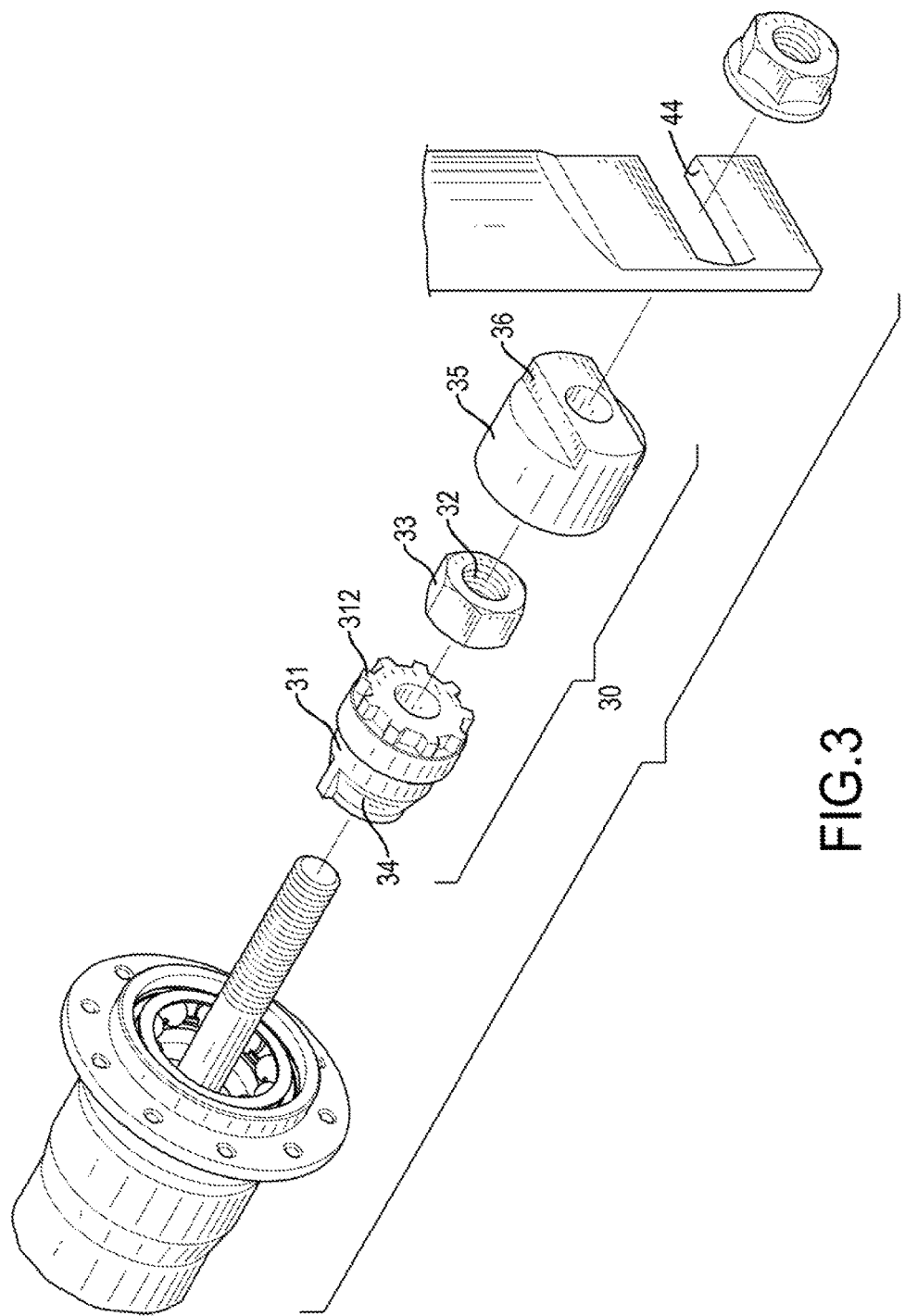
FIG. 3 is a partially exploded perspective view of the wheel hub in FIG. 1.
Figure 4:
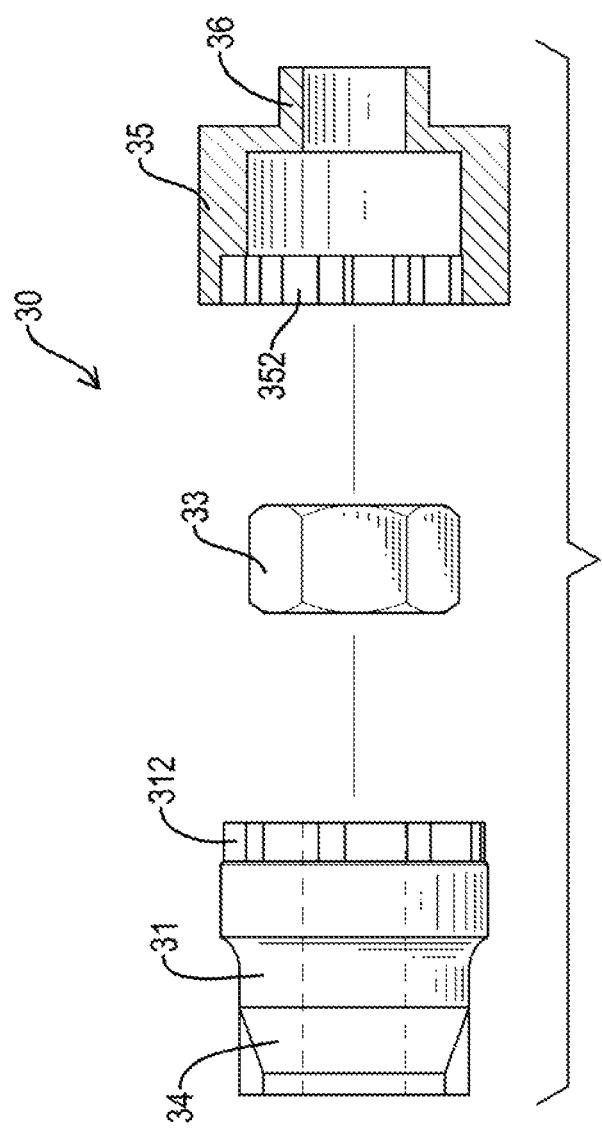
FIG. 4 is an exploded side view in partial section of a first embodiment of the fixing member of the wheel hub in FIG. 2.

With reference to FIGS. 2 to 4, in the first embodiment of the fixing member 30, the fixing member 30 comprises a pressing block 31, a fixing block 35, and a securing nut 33. The pressing block 31 is mounted securely around the axle 12, and the conical surface 34 of the fixing member 30 is formed on an end of the pressing block 31. The fixing block 35 is mounted securely around the axle 12 and is connected with the pressing block 31. The elongated engaging protrusion 36 is formed on an end of the fixing block 35 opposite the pressing block 31. The securing nut 33 is mounted in the fixing block 35 and is provided with the threaded hole 32. In addition, the pressing block 31 has an end extending into the fixing block 35 and an engaging portion 312 formed on the end of the pressing block 31. The fixing block 35 has an inner surface and an engaging portion 352 formed on the inner surface of the fixing block 35 and engaging the engaging portion 312 on the pressing block 31. With the engagement of the engaging portions 312,352 on the pressing block 31 and the fixing block 35, the combination between the pressing block 31 and the fixing block 35 is firm, and the fixing block 31 can be securely connected with the pressing block 35.

With reference to FIG. 5, in a second embodiment, the fixing member 30A is formed as a single part.

With reference to FIG. 2, the pressing jacket 26 is mounted around the axle 12, and is connected with the driving sleeve 22 in a threaded manner. A spring 262 is mounted between the pressing jacket 26 and the fixing member 30. When the pedal of a bicycle is stepped on in a forward direction, the hub body 14 is rotated to drive a wheel of the bicycle to rotate and to enable the bicycle to move forward. When the pedal is stepped on in a backward direction, the driving sleeve 22 is driven to rotate in the backward direction, and the pressing jacket 26 is moved toward the fixing member 30. Consequently, the conical pressing surface 264 on the pressing jacket 26 will press against the inner surface of the braking sleeve 24, and the braking sleeve 24 is expanded to abut against the inner surface of the hub body 14. Thus, a braking effect is provided to the hub body 14 and the wheel of the bicycle to slow down the bicycle.

With reference to FIG. 2, the braking sleeve 24 may have a rough surface formed on a side of the braking sleeve 24 facing the hub body 14. With the arrangement of the rough surface, the braking effect provided by the braking sleeve 24 is improved. In addition, the axle device 10 may further have a middle tube 16 mounted around the braking sleeve 24. With the arrangement of the middle tube 16, the structural strength of the wheel hub can be enhanced, and the braking effect of the braking device 24 can be effectively improved by the friction between the middle tube 16 and the braking sleeve 24.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A wheel hub comprising:
   an axle device having
      an axle having a first end and a second end; and
      a hub body mounted rotatably around the axle; and
   a braking device connected to the axle device and having
      a driving sleeve mounted in the hub body and mounted around the axle at a position adjacent to the first end of the axle;
      a braking sleeve mounted in the hub body, mounted around the axle, and having an inner surface;
      a pressing jacket mounted around the axle, connected with the driving sleeve, and having a conical pressing surface selectively extending into the braking sleeve to press against the inner surface of the braking sleeve; and
      a fixing member mounted in the hub body, mounted around the second end of the axle, and having
         a first end being opposite the braking sleeve; and
         an elongated engaging protrusion formed on and protruding from the first end of the fixing member, wherein
      the fixing member has a threaded hole for being screwed with the axle;
      the fixing member has a second end extending into the hub body and a conical surface mounted in the braking sleeve to selectively abut against the inner surface of the braking sleeve;
      the fixing member comprising
         a pressing block mounted securely around the axle and provided with the conical surface of the fixing member;
         a fixing block mounted securely around the axle and connected with the pressing block; and
         a securing nut mounted in the fixing block and provided with the threaded hole; and
      the elongated engaging protrusion being formed on an end of the fixing block.

2. The wheel hub as claimed in claim 1, wherein
   the pressing block has an end extending into the fixing block and an engaging portion formed on the end of the pressing block;
   the fixing block has an inner surface and an engaging portion formed on the inner surface of the fixing block and engaging the engaging portion on the pressing block.

3. The wheel hub as claimed in claim 2, wherein the braking device further has a spring mounted between the pressing jacket and the fixing member.

4. The wheel hub as claimed in claim 3, wherein the axle device further has a middle tube mounted around the braking sleeve.

5. The wheel hub as claimed in claim 1, wherein the braking device further has a spring mounted between the pressing jacket and the fixing member.

6. The wheel hub as claimed in claim 1, wherein the axle device further has a middle tube mounted around the braking sleeve.

7. A wheel hub comprising:
   an axle device having
      an axle having a first end and a second end; and
      a hub body mounted rotatably around the axle; and
   a braking device connected to the axle device and having
      a driving sleeve mounted in the hub body and mounted around the axle at a position adjacent to the first end of the axle;
      a braking sleeve mounted in the hub body, mounted around the axle, and having an inner surface;
      a pressing jacket mounted around the axle, connected with the driving sleeve, and having a conical pressing surface selectively extending into the braking sleeve to press against the inner surface of the braking sleeve; and
      a fixing member mounted in the hub body, mounted around the second end of the axle, and having
         a first end being opposite the braking sleeve; and
         an elongated engaging protrusion formed on and protruding from the first end of the fixing member, wherein
      the fixing member comprises
         a pressing block mounted securely around the axle;
         a fixing block mounted securely around the axle and connected with the pressing block; and
         a securing nut mounted in the fixing block and provided with a threaded hole; and
      the elongated engaging protrusion is formed on an end of the fixing block.

8. The wheel hub as claimed in claim 7, wherein
the pressing block has an end extending into the fixing block and an engaging portion formed on the end of the pressing block;
the fixing block has an inner surface and an engaging portion formed on the inner surface of the fixing block and engaging the engaging portion on the pressing block.

9. The wheel hub as claimed in claim 8, wherein the braking device further has a spring mounted between the pressing jacket and the fixing member.

10. The wheel hub as claimed in claim 9, wherein the axle device further has a middle tube mounted around the braking sleeve.

\* \* \* \* \*